(12) United States Patent
Ninov et al.

(10) Patent No.: US 9,067,525 B1
(45) Date of Patent: Jun. 30, 2015

(54) ADJUSTABLE LOADING RAMP SYSTEM FOR A VEHICLE (71) Applicants: Deyan Ninov, Royal Oak, MI (US); Joseph S Dehner, Bloomfield Hills, MI (US); Gregory A Howell, Farmington, MI (US)

(72) Inventors: Deyan Ninov, Royal Oak, MI (US); Joseph S Dehner, Bloomfield Hills, MI (US); Gregory A Howell, Farmington, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/209,123

(22) Filed: Mar. 13, 2014

(51) Int. Cl.
*B62D 25/00* (2006.01)
*B60P 1/43* (2006.01)
*B65G 69/30* (2006.01)

(52) U.S. Cl.
CPC .. *B60P 1/43* (2013.01); *B65G 69/30* (2013.01)

(58) Field of Classification Search
CPC ............ B60P 1/43; B60P 1/435; B65G 69/30
USPC ............................................ 296/61; 414/537
See application file for complete search history.

(56) References Cited

U.S. PATENT DOCUMENTS

| 5,312,149 | A | 5/1994 | Boone | |
|---|---|---|---|---|
| 6,837,669 | B2 | 1/2005 | Reed et al. | |
| 7,059,648 | B2 * | 6/2006 | Livingston | 296/62 |
| 7,533,923 | B1 * | 5/2009 | Caldwell | 296/61 |
| 8,511,734 | B2 | 8/2013 | Hutchins et al. | |
| 2003/0071476 | A1 * | 4/2003 | Schilling | 296/61 |
| 2013/0028693 | A1 | 1/2013 | Justak | |
| 2013/0294873 | A1 | 11/2013 | Chastain, Jr. | |

* cited by examiner

*Primary Examiner* — Joseph D Pape
(74) *Attorney, Agent, or Firm* — Ralph E Smith (57) ABSTRACT

A ramp system for a vehicle storage bed includes at least one longitudinal bed channel defining a longitudinal bed track. At least one longitudinal tailgate channel is recessed into an inner panel of the tailgate, aligned with the bed channel, and defines a longitudinal tailgate track. A lateral tailgate track is recessed into the inner panel and extends substantially transverse to and in communication with the bed/longitudinal tailgate tracks. At least one ramp member has a track member configured to be stowed in the bed channel in a stowed position and slidable in the bed/tailgate channels from the stowed position to a fully deployed position during which the track member moves along the respective bed/longitudinal tailgate tracks and into the lateral tailgate track without having to raise the track member out of the respective bed/longitudinal tailgate tracks.

18 Claims, 8 Drawing Sheets

ADJUSTABLE LOADING RAMP SYSTEM FOR A VEHICLE

FIELD

The present disclosure relates generally to vehicles and, more particularly, to an adjustable loading ramp system for a vehicle.

BACKGROUND

Vehicles having storage beds, e.g., pickup trucks, are capable of storing and transporting large objects. Examples of these large objects include recreational vehicles such as all-terrain vehicles (ATVs) and motorcycles. These large objects are typically very heavy and are unable to be lifted into the storage bed by a single person, e.g., a driver of the vehicle. Loading ramps provide for easier loading of these large objects into the storage bed. However, conventional telescoping loading ramps, such as those used in moving trucks, are not laterally adjustable. Other non-integrated ramp systems typically require a user to unload one or more loading ramps from the storage bed, attach and position the one or more ramps, and lock the one or more ramps into place. The user would then need to repeat this process to unlock, detach, and stow the one or more loading ramps. Thus, while such conventional loading ramps work for their intended purpose, there remains a need for improvement in the relevant art.

SUMMARY

In one form, a ramp system for a pickup truck having a bed and a tailgate is provided in accordance with an aspect of the teachings of the present disclosure. The ramp system includes a longitudinal bed channel recessed into a floor of the bed, the bed channel defining a bottom surface having a longitudinal bed track. The ramp system includes a longitudinal tailgate channel recessed into an inner panel of the tailgate, the tailgate channel aligned with the bed channel and defining a bottom surface having a longitudinal tailgate track, the inner panel facing the floor of the bed when the tailgate is in a closed position. The ramp system includes a lateral tailgate track recessed into the inner panel and extending substantially transverse to and in communication with the bed and longitudinal tailgate tracks. The ramp system also includes a ramp member having a track member, the ramp member configured to be stowed in the bed channel in a stowed position and slidable in the bed and tailgate channels from the stowed position to a fully deployed position during which the track member moves along the respective bed and longitudinal tailgate tracks and into the lateral tailgate track without having to raise the track member out of the respective bed and longitudinal tailgate tracks. Upon the track member being received in the lateral tailgate track, the ramp member is laterally adjustable while coupled to the tailgate through movement of the track member in the lateral tailgate track.

In some implementations, in the fully deployed position, the ramp member extends from the lateral tailgate track at the outer end of the tailgate at an incline to a ground surface.

In some implementations, a top surface of the ramp member is flush with a surface of the floor in the stowed position and during movement through the bed and tailgate channels.

In some implementations, the bed and longitudinal tailgate tracks are recessed relative to the bottom surface of the bed and tailgate channels, respectively, and the track members extend below the bottom surface of the bed and tailgate channels to slidably engage the bed and longitudinal tailgate tracks.

In some implementations, the track member is lockable at least one of at a position along the bed, longitudinal tailgate, or lateral tailgate tracks, at the cab end side of the ramp member in the stowed position, and at any position along the lateral tailgate track.

In another form, a vehicle is presented in accordance with an aspect of the teachings of the present disclosure. The vehicle includes a cargo area having a floor and a closure member moveable between an open position and a closed position, the closure member having an inner panel facing the cargo floor in the closed position. The vehicle also includes a ramp system. The ramp system includes a pair of longitudinal floor channels recessed into the floor of the cargo area and laterally spaced apart from each other, the floor channels each defining a bottom surface having a longitudinal floor track. The ramp system includes a pair of longitudinal closure member channels recessed into the inner panel, the closure member channels aligned with the bed channels and each defining a bottom surface having a longitudinal closure member track. The ramp system includes a lateral closure member track recessed into the inner panel and extending substantially transverse to and in communication with the floor and longitudinal closure member tracks. The ramp system includes a pair of ramp members each having a track member, the pair of ramp members configured to be stowed in the floor channels in a stowed position and slidable in the floor and closure member channels from the stowed position to a deployed position during which the track members move along the respective bed and longitudinal closure member tracks and into the lateral closure member track without having to raise the track members out of the respective bed and longitudinal closure member tracks. Upon the track members being received in the lateral closure member track, the ramp members are laterally adjustable relative to each other while coupled to the closure member through movement of one or more of the track members in the lateral closure member track.

In some implementations, the vehicle is a pickup truck, the cargo area is a bed, and the closure member is a tailgate.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

According to the principles of the present disclosure, fully-adjustable vehicle loading ramp systems are presented. One exemplary application for these loading ramp systems is vehicles having storage beds with tailgates, e.g., pickup trucks. According to an aspect of the present disclosure, the loading ramp systems include at least one longitudinal bed channel having a recessed longitudinal bed track. Each longitudinal bed channel receives a ramp member such that the ramp member, in one exemplary implementation, is flush with a bottom surface of the bed. Each ramp member is coupled to a track member that is moveable along the bed track. An inner surface of the tailgate has at least one longitudinal tailgate channel having a recessed longitudinal tailgate track, which is/are substantially aligned with the longitudinal bed channel(s)/track(s).

Each ramp member is moveable through the longitudinal bed and tailgate channels when the tailgate is in an open position. The inner surface of the tailgate also includes a recessed lateral tailgate track. Each track member is moveable along the longitudinal and lateral tailgate tracks when the tailgate is in the open position. In this manner, the ramp member is operable to be fully deployed at an incline with respect to a ground surface, while still being laterally adjustable via the track member along the lateral tailgate track. While the loading ramp systems are described with respect to pickup trucks, it will be appreciated that these loading ramp systems could also be applicable to other vehicles having cargo areas with closure members, e.g., sport utility vehicles and/or station wagons.

Figure 1:
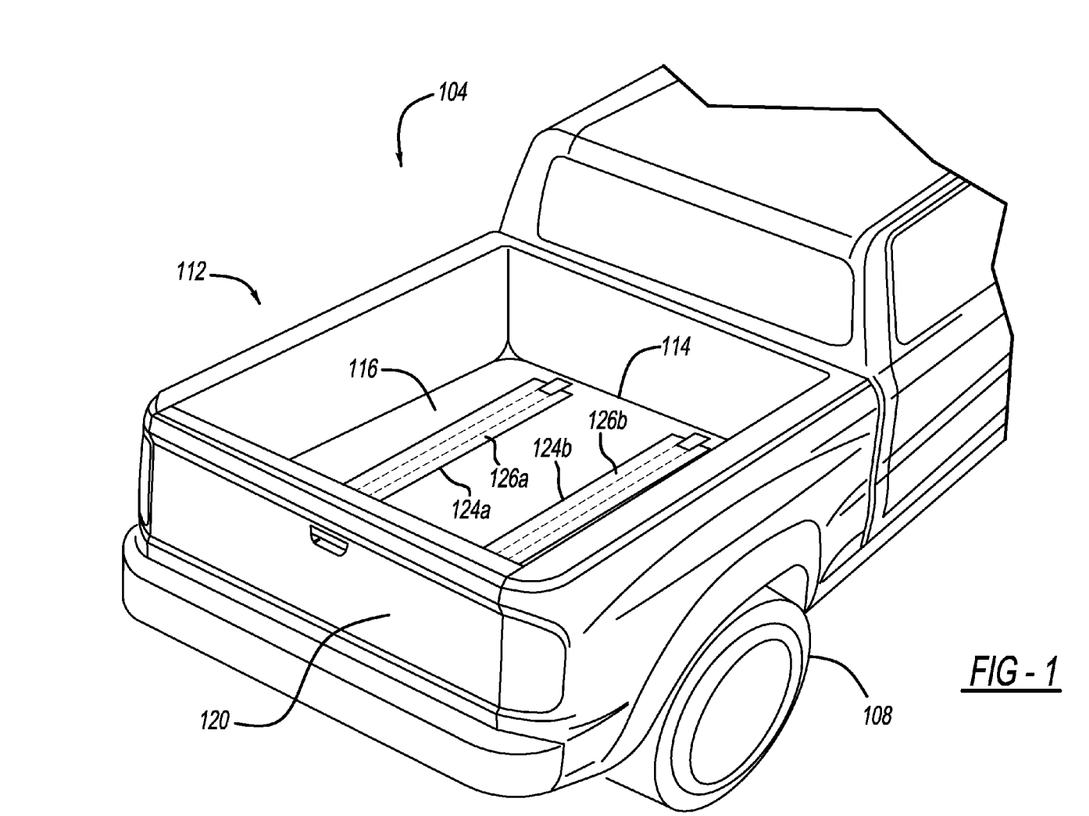
FIG. 1 is a rear perspective view of a vehicle having a storage bed with a tailgate in a closed position and ramp members in a stowed position according to the principles of the present disclosure.

Referring now to FIG. 1, a rear perspective view of a vehicle 104 is illustrated. The vehicle 104 has a storage bed 112 located above one or more rear wheels 108. In one exemplary implementation, the vehicle 104 is a pickup truck as illustrated. In another exemplary implementation, the vehicle 104 is a vehicle having a cargo area above the rear wheel(s) 108 and a closure member, such as a sport utility vehicle with a rear cargo area and a rear hatch. The storage bed 112 has a floor 114 having a bottom surface 116 and a tailgate 120 that is in a closed position. The storage bed 112 includes ramp members 124a and 124b (collectively "ramp members 124") that are shown in a stowed position such that top surfaces 126a and 126b of the ramp members 124 (collectively "top surfaces 126") are flush with the bottom surface 116 of the storage bed 112. In one exemplary implementation, the ramp members 124 are constructed from a lightweight metal, e.g., aluminum, and have top surfaces made of a same material as a remainder of the bottom surface 116 of the storage bed 112.

Figure 2:
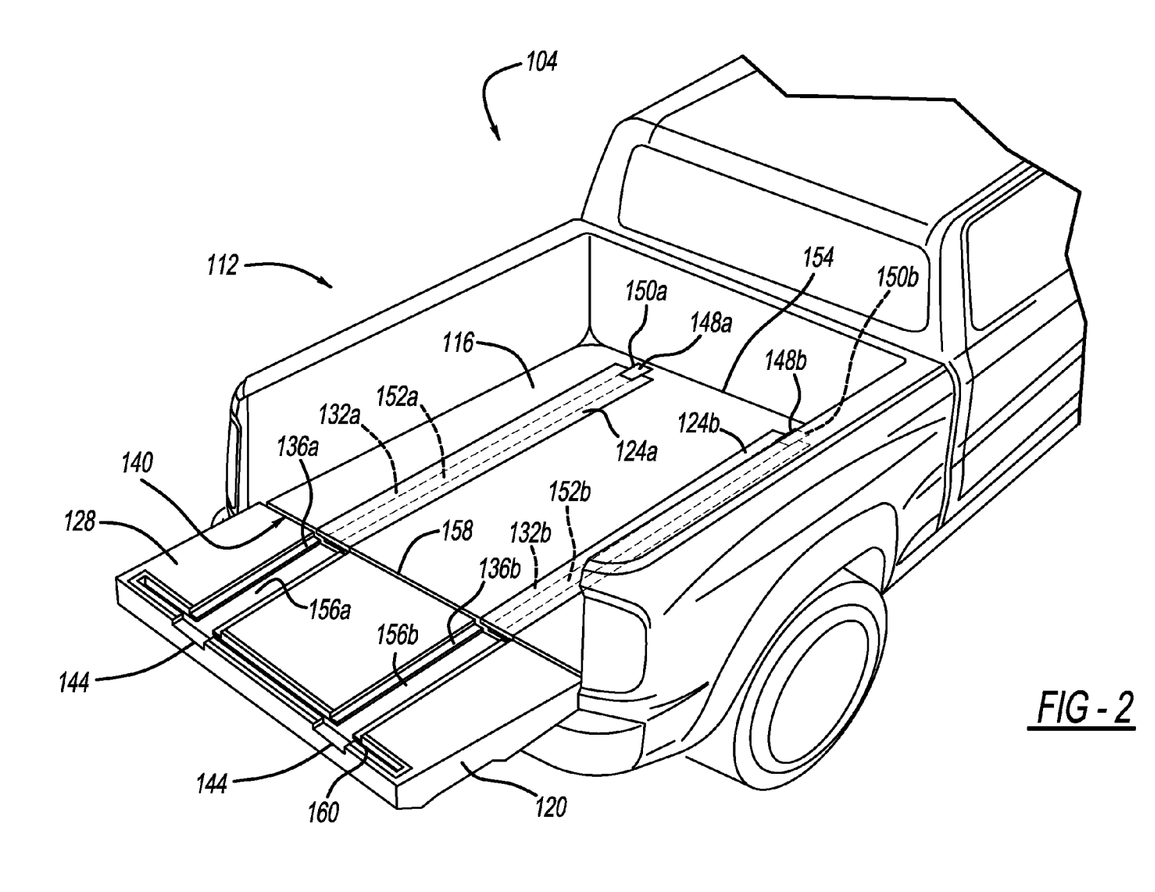
FIG. 2 is a rear perspective view of the vehicle storage bed having the tailgate in an open position and the ramp members in the stowed position according to the principles of the present disclosure.

Referring now to FIG. 2, a rear perspective view of the vehicle 104 having the tailgate 120 in an open position is illustrated. The tailgate 120 has an inner panel or surface 128 that faces the storage bed 112 when the tailgate 120 is in the closed position and that is horizontally or substantially horizontally aligned with the bottom surface 116 of the storage bed 112 when the tailgate 120 is in the open position. The ramp members 124 are shown in a stowed position in longitudinal bed channels 132a and 132b (collectively "bed channels 132") such that the top surfaces 126 of the ramp members 124 are flush with the bottom surface 116 of the storage bed 112. The inner surface 128 of the tailgate 120 includes longitudinal tailgate channels 136a and 136b (collectively "tailgate channels 136") that are aligned or substantially aligned with the bed channels 132 across a gap 140 between the inner surface 128 of the tailgate 120 and the bottom surface 116 of the storage bed 112. The tailgate channels 136 extend from the gap 140 to an opposing edge 144 of the tailgate 120.

In accordance with an aspect of the present disclosure, the ramp members 124 are coupled to track members 148a and 148b (collectively "track members 148"). When the ramp members 124 are in the stowed position, the track members 148 are also flush with the bottom surface 116 of the storage bed 112. In one exemplary implementation, the track members 148 are stowed in extended portions 150a and 150b (collectively "extended portions 150") of the bed channels 132 as shown. In the stowed position, the track members 148 are at a cab-side end 154 of the storage bed 112 that opposes a tailgate side-end 158 of the storage bed 112. The bed channels 132 include recessed longitudinal bed tracks 152a and 152b (collectively "bed tracks 152") and the tailgate channels 136 include recessed longitudinal tailgate tracks 156a and 156b (collectively "longitudinal tailgate tracks 156"). The inner surface 128 of the tailgate 120 also includes a recessed lateral tailgate track 160 ("lateral tailgate track 160") that is in communication with the longitudinal tailgate tracks 156. The track members 148 are slidably moveable through the bed tracks 152, the longitudinal tailgate tracks 156, and optionally the lateral tailgate track 160.

Figure 3:
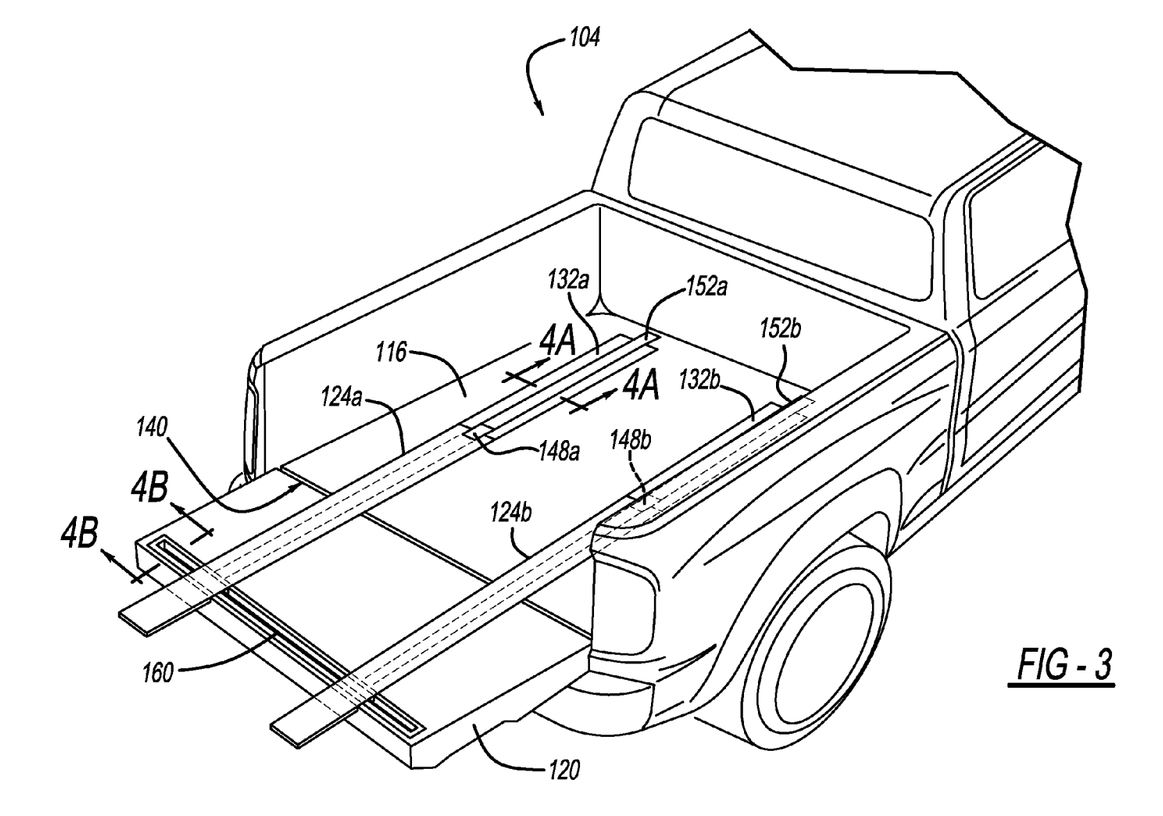
FIG. 3 is a rear perspective view of the vehicle storage bed having the tailgate in the open position and the ramp members in a partially deployed position according to the principles of the present disclosure.

Referring now to FIG. 3 and with continued reference to FIG. 2, a rear perspective view of the ramp members 124 in a partially deployed position is illustrated. The ramp members 124 are slidably moveable through the bed channels 132 and the tailgate channels 136 without having to raise the ramp members 124 out of the bed channels 132 or the tailgate channels 136. In one exemplary implementation, the ramp members 124 include devices at their ends adjacent to the gap 140 that are graspable by a user, e.g., a driver of the vehicle 104, to pull the ramp members 124 through the bed channels 132 and the tailgate channels 136. Alternatively, the user could slidably move the ramp members 124 through the bed channels 132 and the tailgate channels 136 by applying a frictional force to a top surface of the ramp members 124. In this manner, lightweight ramp members 124 provide for easier movement by the user.

Figures 4A, 4B, 5:
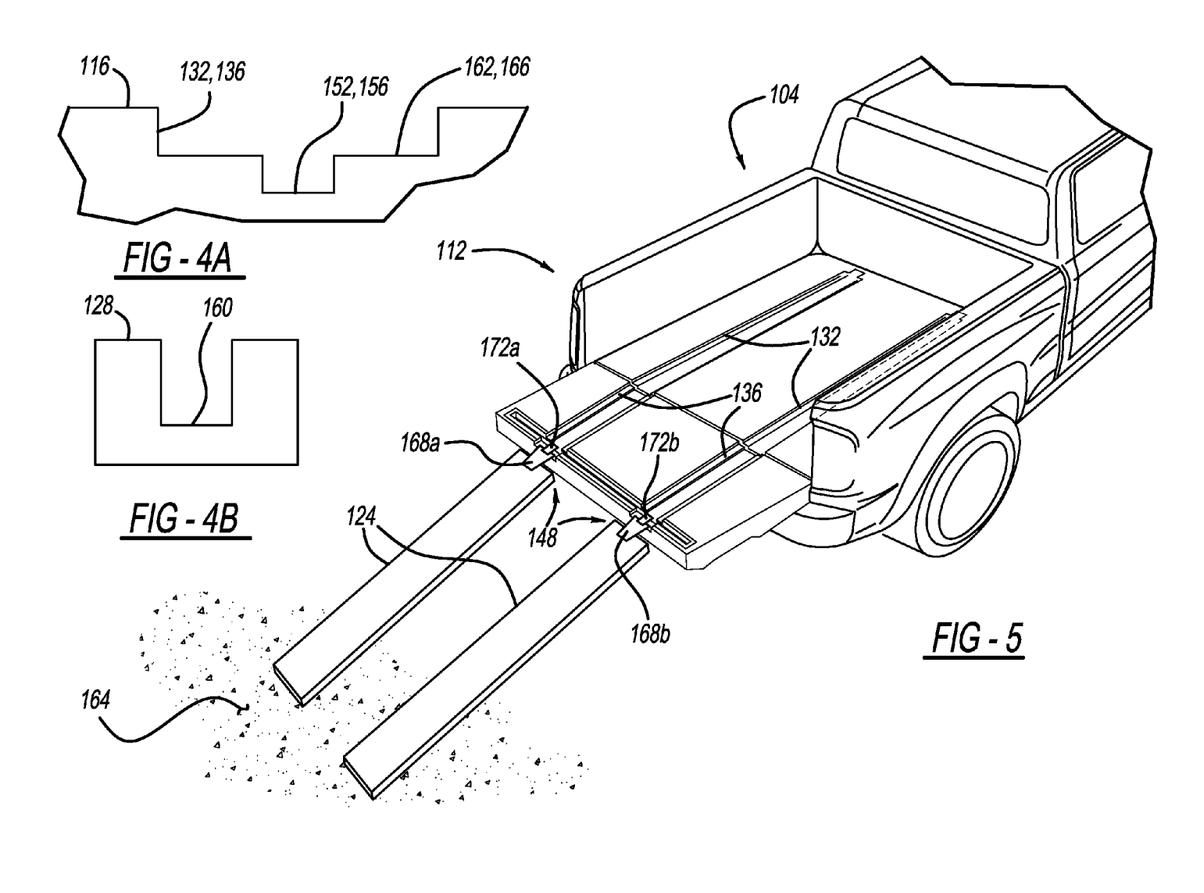
FIG. 4A is a cross-sectional view of the bed/longitudinal tailgate channels/tracks with respect to the bed/inner panel surfaces according to the principles of the present disclosure.
FIG. 4B is a cross-sectional view of a lateral tailgate track with respect to the inner panel surface according to the principles of the present disclosure.
FIG. 5 is a rear perspective view of the vehicle storage bed having the tailgate in the open position and the ramp members in a fully deployed position with a channel based lateral offset according to the principles of the present disclosure.

Referring now to FIGS. 4A and 4B, cross-sectional views along lines 4A-4A and 4B-4B are illustrated. In the exemplary implementation shown in FIG. 4A, the bed channels 132 and the tailgate channels 136 are recessed into the bottom surface 116 of the storage bed 112. The depth of this recess corresponds to a height of the ramp members 124 such that the top surfaces 126 of the ramp members 124 are flush with the bottom surface 116 of the storage bed 112 when in the stowed position and during transition to the deployed position. The bed tracks 152 and the longitudinal tailgate tracks 156 are recessed into bottom surfaces 162 of the bed channels 132 and into bottom surfaces 166 of the tailgate channels 136, respectively. The depth of this recess corresponds to a height of the track members 148. In FIG. 4B, the lateral tailgate track 160 is recessed into the inner surface 128 of the tailgate 120. For example, the lateral tailgate track 160 could be recessed at an equal or substantially similar depth as the bed tracks 152 and the longitudinal tailgate tracks 156.

Referring now to FIG. 5, a rear perspective view of the vehicle 104 having the ramp members 124 in a fully deployed position is illustrated. In the fully deployed position, the ramp members 124 are, in the exemplary implementation illustrated, fully removed from the bed channels 132 and the tailgate channels 136, and are arranged at an incline with respect to a ground surface 164. This particular fully deployed position can also be referred to as the fully deployed position with a normal, default, or channel-based lateral offset. In other words, the ramp members 124 are laterally offset from each other by a distance corresponding to a distance between the bed channels 132 and the tailgate channels 136. As previously mentioned, the ramp members 124 are laterally moveable via the track members 148 through the lateral tailgate track 160 when in the fully deployed position.

Figure 6:
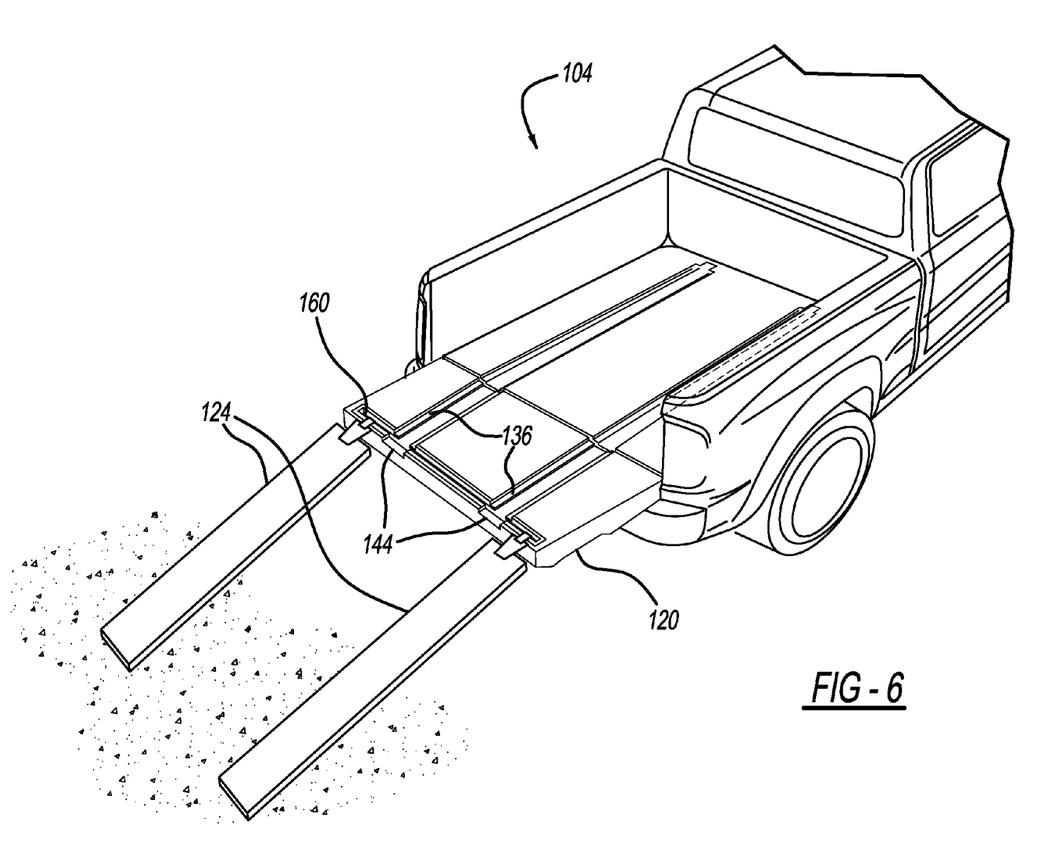
FIG. 6 is a rear perspective view of the vehicle storage bed having the tailgate in the open position and the ramp members in the fully deployed position with a wide lateral offset according to the principles of the present disclosure.
Figure 7:
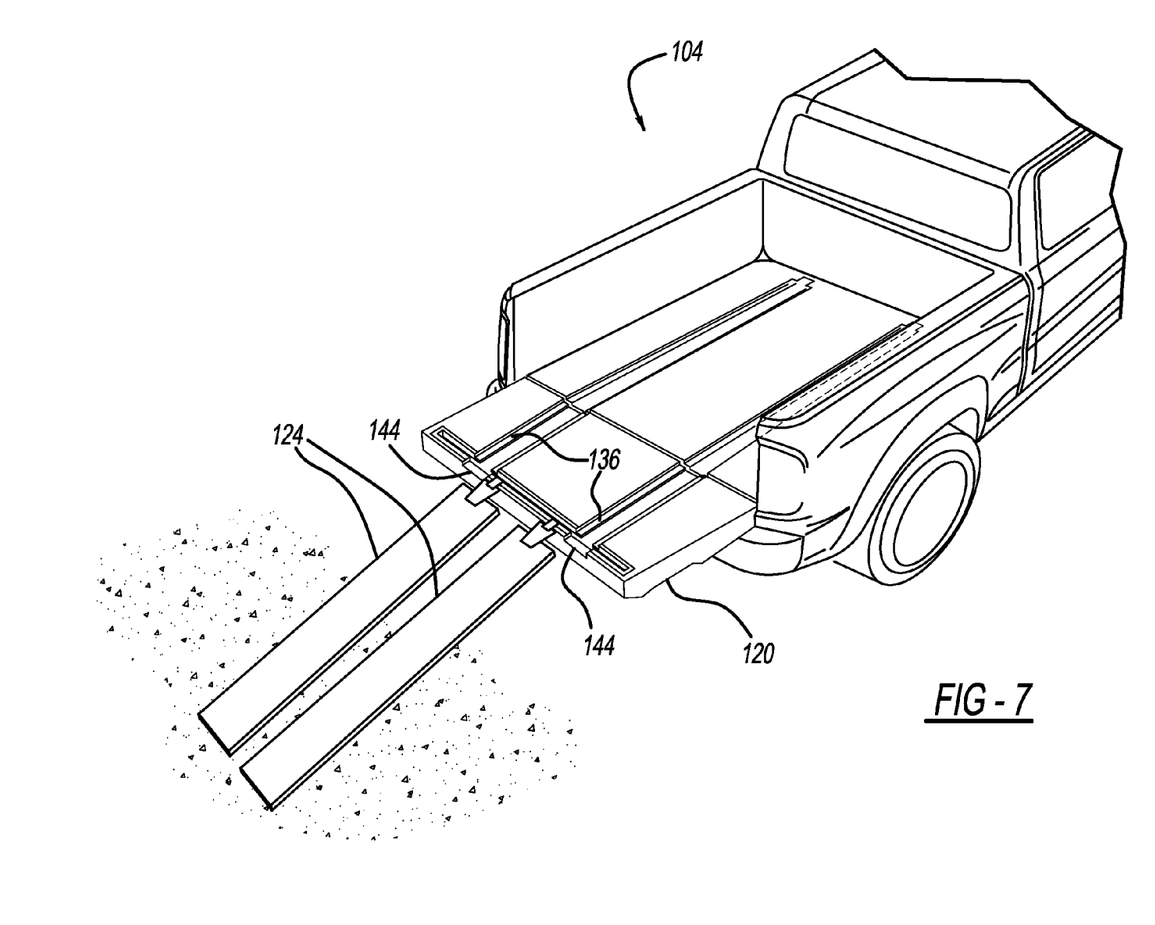
FIG. 7 is a rear perspective view of the vehicle storage bed having the tailgate in the open position and the ramp members in the fully deployed position with a narrow lateral offset according to the principles of the present disclosure.

Referring now to FIG. 6, a rear perspective view of the vehicle 104 having the ramp members 124 in the fully deployed position with a wide lateral offset is illustrated. This fully deployed position could be particularly useful for loading objects with wheels having a wide lateral offset, e.g., all-terrain vehicles having a wide wheelbase. Referring now to FIG. 7, a rear perspective view of the vehicle 104 having the ramp members 124 in the fully deployed position with a narrow lateral offset is illustrated. This fully deployed position could be particularly useful for loading objects with wheels having a narrow lateral offset, e.g., all-terrain vehicles having a narrow wheelbase.

Figure 8:
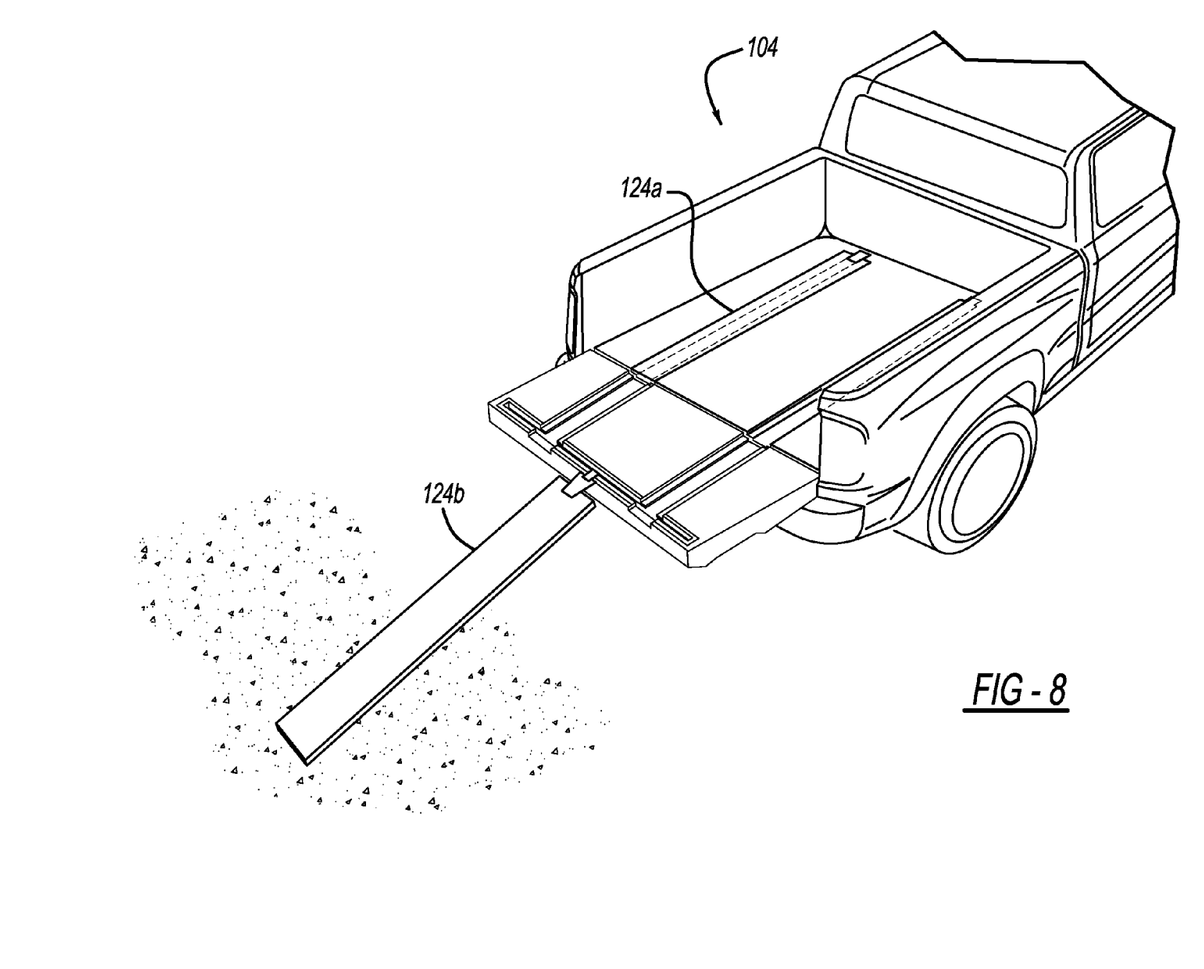
FIG. 8 is a rear perspective view of the vehicle storage bed having the rear tailgate in the open position, one of the ramp members in the stowed position, and the other ramp member in the fully deployed position with a centered lateral offset according to the principles of the present disclosure.

Referring again to FIG. 4B and with continued reference to FIGS. 6-7, the lateral tailgate track 160 could alternatively be recessed at a shallower depth to accommodate the ramp members 124 being in the fully deployed position with the wide or narrow offsets due to the lack of the tailgate channels 136 at the end 144 of the tailgate 120 for these positions. Referring now to FIG. 8, a rear perspective view 800 of the vehicle 104 having only one of the ramp members 124b in the fully deployed position is illustrated. The other ramp member 124a is in the stowed position. In one exemplary implementation, the ramp member 124b could be positioned in a lateral center with respect to the storage bed 112 as shown. This fully deployed position could be particularly useful for loading objects with a single wheel or with multiple inline wheels, e.g., a motorcycle. It will be appreciated that while vehicle 104 is shown in FIG. 8 having two ramp members 124, vehicle 104 can alternatively include only one ramp member 124 and only one corresponding bed channel 132, tailgate channel 136, bed track 152 and tailgate track 156 together with lateral track 160.

The ramp members 124 are moveable along and through the bed channels 132 and across the gap 140 into, along, and through the longitudinal tailgate channels 136 without being lifted out of the channels 132, 136. Similarly, the track members 148 are moveable along and through the bed tracks 152 and across the gap 140 into, along, and through the longitudinal tailgate tracks 156 without themselves or the ramp members 124 being lifted out of their respective tracks 152, 156 or channels 132, 136, respectively. Additionally, the track members 148 are moveable from the longitudinal tailgate tracks 156 into, along, and through the lateral tailgate track 160 without themselves or the ramp members 124 being lifted out of their respective tracks 152, 156 or channels 132, 136, respectively.

In one exemplary implementation, the track members 148 are lockable at any position along the bed tracks 152, the longitudinal tailgate tracks 156, and the lateral tailgate track 160 (see FIG. 5). In another exemplary implementation, the track members 148 are lockable at any position along the lateral tailgate track 160. When the track members 148 are locked, the track members 148 are not slidably moveable in and along the corresponding tracks. The track members 148 are lockable to prevent movement during loading via the ramp members 124. Any suitable locking mechanisms could be implemented to achieve locking of the track members 148. For example only, the track members 148 and the tracks 152, 156, and 160 could all be constructed from metal and magnetic locking of the track members 148 could be implemented.

Figure 9:
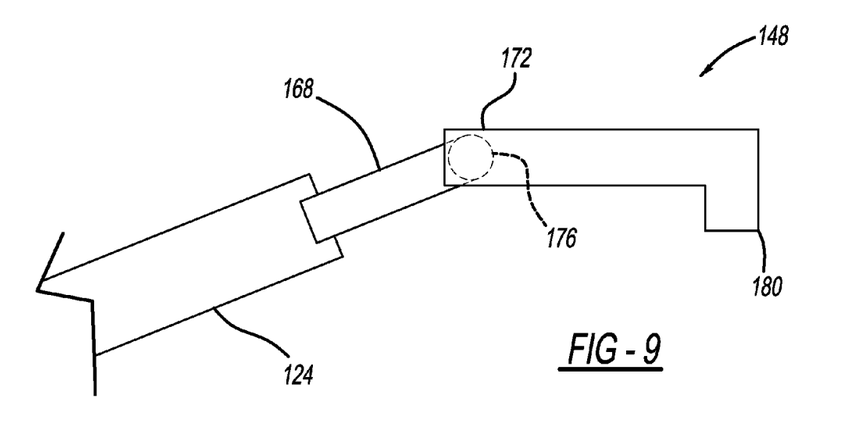
FIG. 9 is a side perspective view of a track member of one of the ramp members according to the principles of the present disclosure.

Referring now to FIG. 9, a side perspective view of an exemplary configuration of the track members 148 is illustrated. The ramp members 124 are connected to an arm member 168. The arm member 168 is pivotably connected to a head member 172, such as by a pivot member 176. Thus, the ramp member 124 and arm member 168 are free to rotate via the pivot member 176 while the head member 172 remains stationary with respect to the various tracks 152, 156, and 160. In accordance with an aspect of the present disclosure, the track member 148 further includes an end member 180 connected to the head member 172 at an opposite end of the track member 148 from the ramp member 124. The end member 180 is operable to slidably move in and along the various tracks 152, 156, and 160. It will be appreciated that other configurations could be utilized, such as having the head members 172 directly pivotably coupled to the ramp members 124.

Figure 10A:
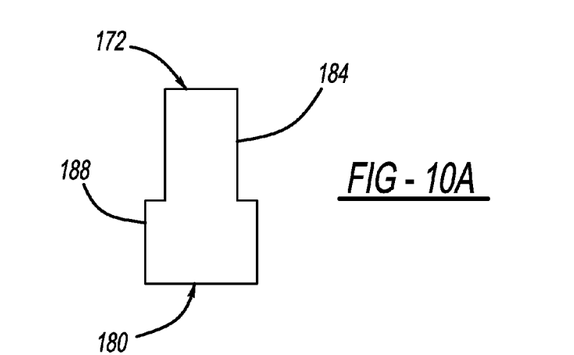
FIG. 10A is an end perspective view of an exemplary configuration of the track member according to the principles of the present disclosure.
Figure 10B:
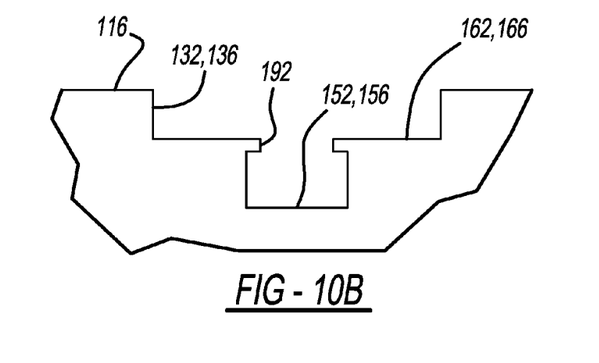
FIG. 10B is a cross-sectional view of an exemplary configuration of the longitudinal bed track according to the principles of the present disclosure.

Referring now to FIGS. 10A-10B, exemplary configurations of the head member 172, the end member 180, the bed tracks 152, and the longitudinal tailgate tracks 156 are shown. FIG. 10A illustrates an end perspective view of the head member 172 and the end member 180. As illustrated, the head member 172 has a width 184 that is smaller than a width 188 of the end member 180. This configuration is operable to slidably move in and along the bed tracks 152 and longitudinal tailgate tracks 156 illustrated by FIG. 10B. More specifically, these tracks 152 and 156 include an upper lip 192 that defines an upper gap that is narrower than the width 188 of the end member 180. Thus, the end member 180 slidably moves in and along the bed tracks 152 and the longitudinal tailgate tracks 156 without being able to be lifted out of or removed from the tracks 152 and 156. While this exemplary configuration is shown with respect to the bed tracks 152 and the longitudinal tailgate tracks 156, it should be appreciated that the lateral tailgate track 160 could have a similar upper lip 192 and could slidably move in the lateral tailgate track 160 without being able to be lifted out of or removed from the lateral tailgate track 160.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A ramp system for a pickup truck having a bed and a tailgate, the ramp system comprising:
    a longitudinal bed channel recessed into a floor of the bed, the bed channel defining a bottom surface having a longitudinal bed track;
    a longitudinal tailgate channel recessed into an inner panel of the tailgate, the tailgate channel aligned with the bed channel and defining a bottom surface having a longitudinal tailgate track, the inner panel facing the floor of the bed when the tailgate is in a closed position;
    a lateral tailgate track recessed into the inner panel and extending substantially transverse to and in communication with the bed and longitudinal tailgate tracks; and
    a ramp member having a track member, the ramp member configured to be stowed in the bed channel in a stowed position and slidable in the bed and tailgate channels from the stowed position to a fully deployed position during which the track member moves along the respective bed and longitudinal tailgate tracks and into the lateral tailgate track without having to raise the track member out of the respective bed and longitudinal tailgate tracks;
    wherein upon the track member being received in the lateral tailgate track, the ramp member is laterally adjustable while coupled to the tailgate through movement of the track member in the lateral tailgate track.

2. The ramp system of claim 1, wherein the lateral tailgate track is at an outer end of the tailgate when the tailgate is in an open position, the outer end being opposed to an inner end of the tailgate that is adjacent to the floor.

3. The ramp system of claim 2, wherein, in the fully deployed position, the ramp member extends from the lateral tailgate track at the outer end of the tailgate at an incline to a ground surface.

4. The ramp system of claim 3, wherein the track member comprises a head member pivotably coupled thereto, and wherein the head member comprises an end member that is slidably movable in and along the bed track and the longitudinal and lateral tailgate tracks.

5. The ramp system of claim 1, wherein the bed and longitudinal tailgate channels are substantially horizontally aligned when the tailgate is in the open position.

6. The ramp system of claim 1, wherein a top surface of the ramp member is flush with a surface of the floor in the stowed position and during movement through the bed and tailgate channels.

7. The ramp system of claim 6, wherein the top surface of the ramp member is a same material as the surface of the floor.

8. The ramp system of claim 1, wherein the bed and longitudinal tailgate tracks are recessed relative to a bottom surface of the bed and tailgate channels, respectively, and wherein the track members extend below the bottom surface of the bed and tailgate channels to slidably engage the bed and longitudinal tailgate tracks.

9. The ramp system of claim 1, wherein the track member is at a cab-side end of the ramp member when the ramp member is in the stowed position, the cab-side end opposed to a tailgate side end of the ramp member.

10. The ramp system of claim 9, wherein the track member is lockable at a position along the bed, longitudinal tailgate, or lateral tailgate tracks.

11. The ramp system of claim 10, wherein the track member is lockable at the cab-side end of the ramp member in the stowed position, and wherein the track member is lockable at any position along the lateral tailgate track.

12. The ramp system of claim 1, wherein the longitudinal bed channel comprises a pair of longitudinal bed channels laterally spaced apart, wherein the longitudinal tailgate channel comprises a pair of longitudinal tailgate channels spaced laterally apart, and wherein the ramp member comprises a pair of ramp members.

13. The ramp system of claim 12, wherein the pairs of longitudinal bed and tailgate channels and tracks are substantially longitudinally aligned.

14. A vehicle comprising:
    a cargo area having a floor and a closure member moveable between an open position and a closed position, the closure member having an inner panel facing the cargo floor when in the closed position; and
    a ramp system including:
        a pair of longitudinal floor channels recessed into the floor of the cargo area and laterally spaced apart from each other, the floor channels each defining a bottom surface having a longitudinal floor track;
        a pair of longitudinal closure member channels recessed into the inner panel, the closure member channels aligned with the bed channels and each defining a bottom surface having a longitudinal closure member track;
        a lateral closure member track recessed into the inner panel and extending substantially transverse to and in communication with the floor and longitudinal closure member tracks;
        a pair of ramp members each having a track member, the pair of ramp members configured to be stowed in the floor channels in a stowed position and slidable in the floor and closure member channels from the stowed position to a fully deployed position during which the track members move along the respective bed and longitudinal closure member tracks and into the lateral closure member track without having to raise the track members out of the respective bed and longitudinal closure member tracks;
        wherein upon the track members being received in the lateral closure member track, the ramp members are laterally adjustable relative to each other while coupled to the closure member through movement of one or more of the track members in the lateral closure member track.

15. The vehicle of claim 14, wherein the vehicle is a pickup truck, wherein the cargo area is a bed, and wherein the closure member is a tailgate.

16. The vehicle of claim 14, wherein each track member comprises a head member pivotably coupled thereto, and wherein the head member comprises an end member that is slidably movable in and along its respective floor track, its respective longitudinal closure member track, and the lateral closure member track.

17. The vehicle of claim 14, wherein the floor and longitudinal closure member channels are substantially horizontally aligned when the closure member is in the open position.

18. The vehicle of claim 14, wherein a top surface of each ramp member is flush with a surface of the floor in the stowed position and during movement through the floor and closure member channels.

* * * * *